United States Patent Office.

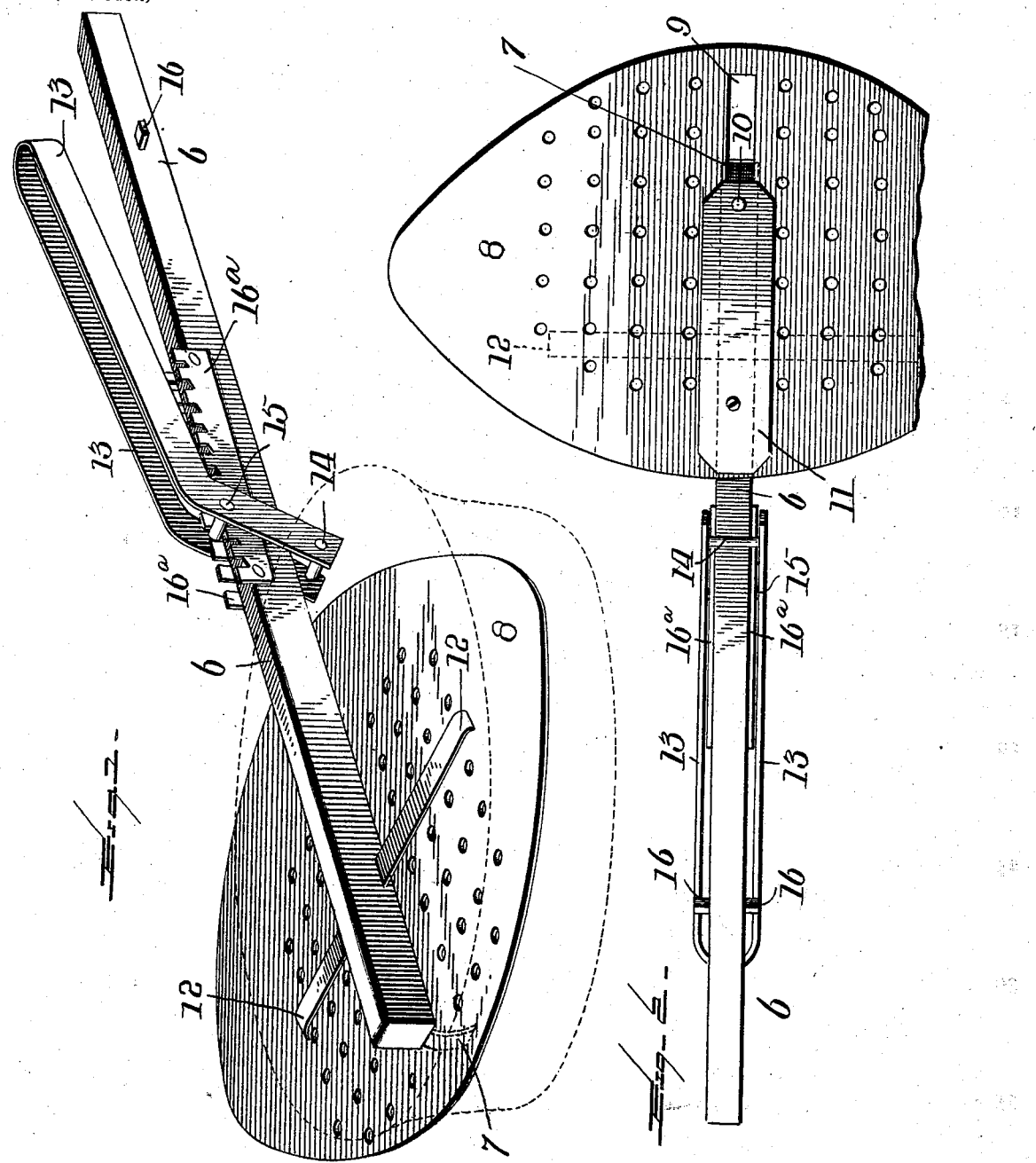

MAGGIE WARNER, OF CHICAGO, ILLINOIS.

STRAINER.

SPECIFICATION forming part of Letters Patent No. 695,593, dated March 18, 1902.

Application filed September 20, 1901. Serial No. 75,730. (No model.)

*To all whom it may concern:*

Be it known that I, MAGGIE WARNER, a citizen of the United States, residing at Chicago, in the county of Cook and State of Illinois, have invented certain new and useful Improvements in Strainers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to strainers for pots and kettles, and particularly comprises a utensil which is adapted to strain the liquor from a kettle or similar receptacle and also to tip the kettle, so that the liquor will run therefrom without the necessity of touching the heated body of the kettle.

A further object of the invention is to provide means for adjusting the utensil so that it can be used on kettles of different sizes.

With these and other objects in view the invention is hereinafter described and is illustrated in the drawings, in which—

Figure 1 is a perspective view of the invention as applied to a kettle. Fig. 2 is a bottom plan view of the strainer, showing the perforated plate in extended position.

Referring more particularly to the drawings, the strainer consists of a bar 6, adapted to span the mouth of a kettle or similar vessel and to form a handle by which the device is operated. At the forward end of the bar is a lug or projection 7, slightly retracted, to engage beneath the flange or bead formed at the edge of the kettle. A foraminous plate 8 is secured to the bar near the forward end thereof. This plate is longitudinally adjustable along the bar by means of the slot 9, through which extend screws 10, and these screws pass through a retaining-plate 11, which is wider than the slot 9. A laterally-extending bar 12 is secured to the bar 6, and this bar is adapted to strengthen and support the laterally-extending portions of the plate 8, so that they will not be bent or otherwise displaced by the weight of the solids within the kettle. A lever 13 is adjustably mounted upon the bar and is adapted to engage the edge of the kettle at a point opposite to that engaged by the lug 7. This lever consists of a metallic rod bent to substantially U shape, and the lower ends of the rod are connected by a rivet 14. Another rivet 15 connects the arms of the rod and forms the pivot at the fulcrum of the lever, the bar 6 extending through between these rivets loosely. Racks 16ª are secured to the sides of the bar 6, and the teeth thereof extend above the top of the bar in a position to engage the rivet 15. Studs 16 project from each side of the bar and serve to retain the lever upon the bar.

In operation the hook 7 is caught on the outer edge of a kettle and the lever moved forward until it comes in contact with the opposite outer edge. The rivet 15 is then caused to engage with the teeth of the rack-bars, and the lever is pressed down against the bar, causing the kettle to be gripped between the lug 7 and the head of the lever, in which position the kettle may be held and tilted to accomplish the purpose of the device.

Having thus described the invention, what is claimed as new, and desired to be secured by Letters Patent, is—

1. A strainer for kettles and similar articles, comprising a bar adapted to be placed across the mouth of the kettle, means on the bar to clutch the edge of the vessel, and a foraminous plate secured to the bar and longitudinally adjustable thereof.

2. A strainer for kettles or similar articles comprising a bar adapted to be placed across the mouth of the vessel, a longitudinally-adjustable foraminous plate attached thereto, a lug at the end of the bar adapted to engage one edge of the vessel, and a catch adjustable longitudinally on the bar and adapted to engage the opposite edge of the vessel.

In testimony whereof I affix my signature in presence of two witnesses.

MAGGIE WARNER.

Witnesses:
NELLIE FELTSKOG,
HARRY G. BATCHELOR.